(12) United States Patent
Wright et al.

(10) Patent No.: US 10,532,674 B2
(45) Date of Patent: Jan. 14, 2020

(54) VEHICLE SEAT

(71) Applicant: Faurecia Automotive Seating, LLC, Auburn Hills, MI (US)

(72) Inventors: Kevin L. Wright, Highland, MI (US); Robert C. Fitzpatrick, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 9 days.

(21) Appl. No.: 16/048,704

(22) Filed: Jul. 30, 2018

(65) Prior Publication Data

US 2019/0039486 A1 Feb. 7, 2019

Related U.S. Application Data

(60) Provisional application No. 62/539,727, filed on Aug. 1, 2017, provisional application No. 62/539,737, filed on Aug. 1, 2017.

(51) Int. Cl.
| | |
|---|---|
| *B60N 2/56* | (2006.01) |
| *B60N 2/58* | (2006.01) |
| *B60N 2/60* | (2006.01) |
| *B60N 2/64* | (2006.01) |
| *B60N 2/70* | (2006.01) |

(52) U.S. Cl.
CPC ......... *B60N 2/5685* (2013.01); *B60N 2/5692* (2013.01); *B60N 2/58* (2013.01); *B60N 2/6018* (2013.01); *B60N 2/643* (2013.01); *B60N 2/7017* (2013.01)

(58) Field of Classification Search
CPC ...... B60N 2/5685; B60N 2/5692; B60N 2/58; B60N 2/686; B60N 2/6018; B60N 2/643; B60N 2/7017; B60N 2/5657; B60N 2/646; B60N 2/48; B60N 2/5678; B60N 2/60; B60N 2/6027
USPC ..................................................... 297/180.12
See application file for complete search history.

(56) References Cited

U.S. PATENT DOCUMENTS

| | | | |
|---|---|---|---|
| 8,662,579 B2 | 3/2014 | Yoshizawa | |
| 9,096,157 B2 | 8/2015 | Line | |
| 9,358,911 B2 | 6/2016 | Brncick | |
| 9,637,034 B2 | 5/2017 | Himmel, IV | |
| 9,649,963 B2 | 5/2017 | Line | |
| 9,707,873 B2 * | 7/2017 | Line | B60N 2/643 |
| 2010/0026077 A1 * | 2/2010 | Tarumi | A47C 7/021 297/452.62 |
| 2010/0171346 A1 * | 7/2010 | Laframboise | B29C 44/12 297/183.1 |
| 2011/0121624 A1 * | 5/2011 | Brncick | B60N 2/0232 297/284.2 |

(Continued)

OTHER PUBLICATIONS

Magi et al., "Dossier optimisé 'Opti-Back' à couche de PU réduite," Faurecia Sièges d'Automobile : Bulletin d'information technique, Oct. 2012, p. 9, 1 page.

*Primary Examiner* — Mark R Wendell
(74) *Attorney, Agent, or Firm* — Barnes & Thornburg LLP

(57) ABSTRACT

A vehicle seat includes a seat bottom and a seat back. The seat back is coupled to the seat bottom and arranged to extend upwardly from the seat bottom. The seat back includes a seat-back frame and a comfort integrator unit to be mounted to the seat-back frame, as well as a seat-cover shell that can be positioned over the mounted comfort integrator unit.

20 Claims, 4 Drawing Sheets

(56) References Cited

U.S. PATENT DOCUMENTS

| | | | |
|---|---|---|---|
| 2012/0261974 A1* | 10/2012 | Yoshizawa | B60N 2/5642 297/452.42 |
| 2014/0203599 A1* | 7/2014 | Line | B60N 2/5642 297/180.14 |
| 2016/0052434 A1* | 2/2016 | Himmel, IV | B60N 2/64 297/452.18 |
| 2016/0096450 A1* | 4/2016 | Kondrad | B60N 2/7094 297/285 |
| 2016/0347224 A1 | 12/2016 | Line | |
| 2017/0368960 A1* | 12/2017 | Whitmore | B60N 2/56 |
| 2018/0056834 A1* | 3/2018 | Line | B60N 2/2222 |

* cited by examiner

VEHICLE SEAT

PRIORITY CLAIM

This application claims priority under 35 U.S.C. § 119(e) to U.S. Provisional Application Ser. Nos. 62/539,727 and 62/539,737, filed Aug. 1, 2017, each of which is expressly incorporated by reference herein.

BACKGROUND

The present disclosure relates to a seat back, and particularly to modular assembly of a seat back. More particularly, the present disclosure relates to modular assembly of a vehicle seat back.

SUMMARY

According to the present disclosure, a vehicle seat includes a seat bottom and a seat back. The seat back is coupled to the seat bottom and arranged to extend upwardly from the seat bottom.

In illustrative embodiments, the seat back includes a seat-back frame and a comfort integrator unit to be mounted to the seat-back frame, as well as a seat-cover shell that can be positioned over the mounted comfort integrator unit to be zippered closed around the comfort integrator unit and the seat-back frame. As a result, the seat-cover shell may be sculpted hold the relative position of the components that make up the comfort integrator unit in a fixed location in the seat back and relative to the seat-back frame.

In illustrative embodiments, the comfort integrator unit is configured to be secured to the seat-back frame, the comfort integrator unit including an integrator shell, a lumbar system coupled to the integrator shell to hang from cross-bars include in the integrator shell, and a comfort layer coupled to a passenger-receiving face of the integrator shell so as to locate the lumbar system between integrator shell and the comfort layer.

In illustrative embodiments, the comfort integrator unit further comprises a thermal component coupled to the comfort layer and located between the passenger-receiving sculpted face of the seat-cover shell and comfort layer. The thermal comfort component may be a resistive heat mat or a thermoelectric component comprising conductive material strips configured to provide both heating and cooling. Each conductive material strip may include an integrated thermal engine and heat exchanger configured to be affixed within openings formed in the comfort layer.

In illustrative embodiments, the seat-cover shell may comprise a hinge at a length of an interface between the passenger receiving sculpted face and the rigid back face sculpted seat cover shell further comprises a zipper extending laterally from each side of the hinge configured to maintain the seat-cover shell in the closed position. The comfort integrator may comprises integral side bolsters and be made of a molded plastic material.

In another illustrative embodiment, a method may be provided for assembling the vehicle seat back comprising providing a comfort integrator unit comprising at least a plastic comfort integrator, a comfort layer coupled to the plastic comfort integrator, and a lumbar system coupled therebetween, coupling the comfort integrator unit to a vehicle seat-back frame, encasing the comfort integrator unit and the vehicle seat-back frame in a sculpted seat cover shell by pulling the shell over the comfort integrator unit and the vehicle component in a shell opened position, and securing the shell in a closed position to establish the seat back.

In illustrative embodiments, the shell comprises a passenger receiving sculpted face and a rigid back face, joined together at a hinged top interface, and the shell is secured via zippers extending longitudinally from each end of the hinged top interface.

In illustrative embodiments, coupling the comfort integrator unit to the vehicle seat-back frame is performed robotically by automated insertion of fasteners into the vehicle seat back and the plastic comfort integrator.

In illustrative embodiments, the comfort integrator unit further comprises a thermal comfort component coupled to the comfort layer so that the thermal comfort component is positioned between the comfort layer and the passenger receiving sculpted face of the sculpted seat cover shell. The thermal comfort component may be a resistive heat mat or a thermoelectric component comprising conductive material strips configured to provide both heating and cooling. Each conductive material strip may include an integrated thermal engine and heat exchanger configured to be affixed within openings formed in the comfort layer. The method may further comprise coupling a thermal comfort component to the comfort layer prior to coupling the comfort integrator unit to the vehicle seat-back frame. The comfort integrator unit may further comprise a lumbar support system coupled between the comfort layer and the integrator shell.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
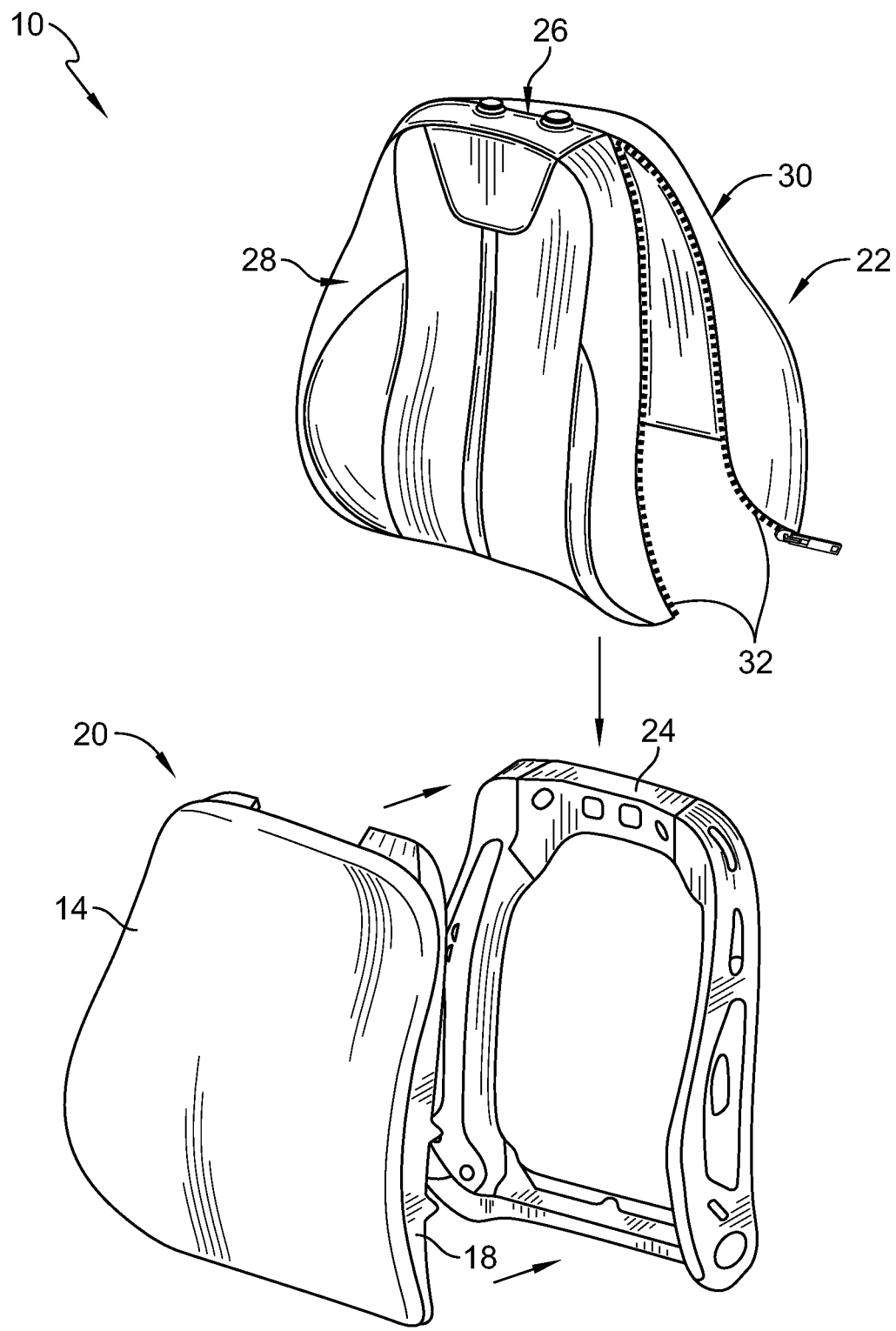
FIG. 1 is an exploded perspective view of a vehicle seat back of a vehicle seat showing a frame, a comfort integrator unit configured to be secured to the frame, and a seat-cover shell configured to be brought down over the secured comfort integrator unit and vehicle frame and closed around the secured comfort integrator unit and vehicle frame.

A seat back 10 is provided as show in FIG. 1. This vehicle seat back 10 includes a seat-back frame 24, a comfort integrator unit 20 that is configured to secure to a front-facing side of the seat frame, as shown by arrows, and a seat-cover shell 22 that is configured to be installed down over the seat-back frame 24 and the comfort integrator unit 20 as shown by the downward arrow. Seat-back frame 24 may be a metal frame configured to support the comfort integrator unit 20. Comfort integrator unit 20 may include a comfort layer 14 coupled to a forward facing surface of an integrator shell 18.

Comfort layer may be, for example, a foam layer. Integrator shell 18 may be, for example, a plastics molded shell. Seat-cover shell 22 may include a forward-facing and comfort molded 26 passenger-receiving sculpted face 28 and a rigid back face 22 joined together at a hinged top 26, which may be formed by stitching the top of the passenger-receiving sculpted face 28 to the rigid back face 22. The seat-cover shell 22 is moveable between an open position and a closed position via a zipper 32 extending along each lateral side of the seat-cover shell 22 from opposite ends of the hinge 26. Each of the passenger-receiving sculpted face 28 and the rigid back face 22 may be formed of pressed foams and synthetic material seat covers. An example of a sculpted seat back component and a process that may be used to form it is found in U.S. Pat. No. 8,794,708 entitled "MOTOR VEHICLE SEAT UPHOLSTERY FORMATION" incorporated by reference in its entirety.

Figure 2:
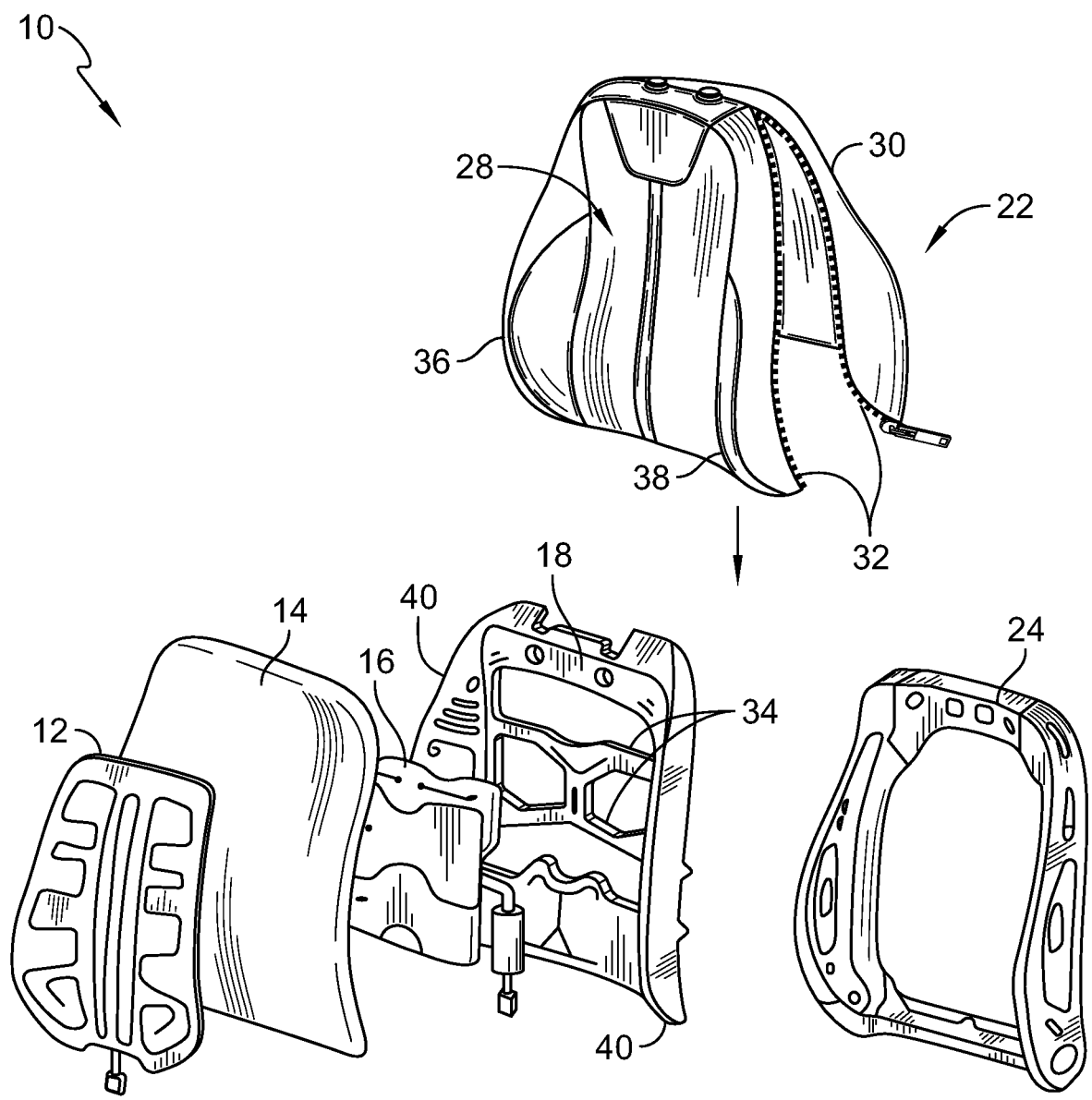
FIG. 2 is an exploded assembly view of a comfort integrator unit of a vehicle seat back according to FIG. 1 including a thermal comfort component, a comfort layer, a lumbar system, and an integrator shell.

A seat back 10 in which the comfort integrator unit can incorporate further comfort features including a thermal comfort unit 12 and a lumbar support system 16 as shown in FIG. 2. Integrator shell 18 has integrated plastic cross-bar supports 34 configured for lumbar system 16 to be hung on and supported so that the lumbar system 16 is positioned between the comfort layer 14 and the integrator shell 34. Integrator shell 18 may further be formed to include molded side bolsters 40. In this manner, comfort layer 14 may be thinner without sacrificing comfort. In this embodiment, thermal comfort unit 12, may be a resistive heat mat. Thermal comfort unit may be mounted via an adhesive or tape, for example, to the surface of the comfort layer 14.

Figure 3:
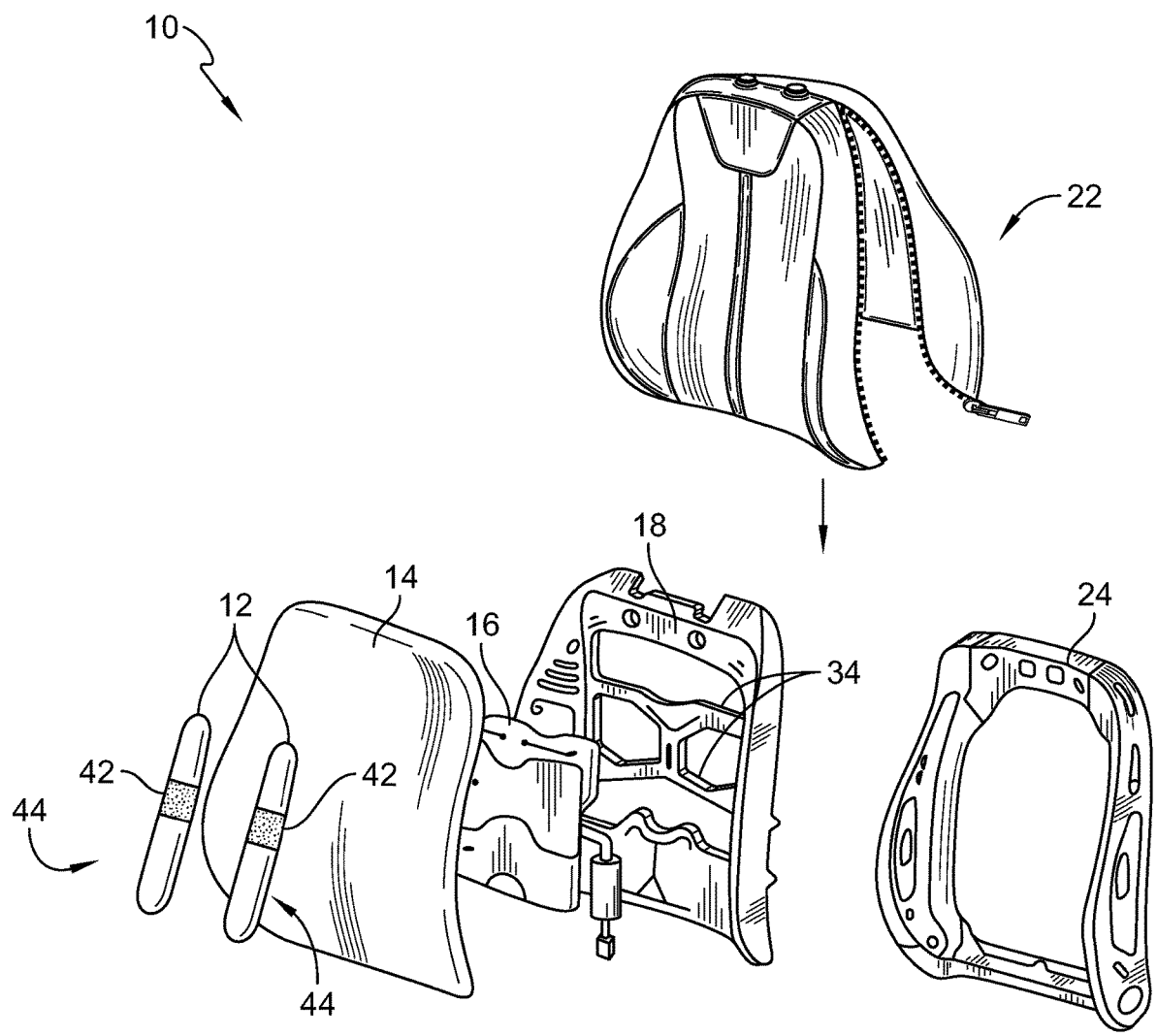
FIG. 3 is an exploded view of a comfort integrator unit of a vehicle seat back according to FIG. 1 according to another embodiment, including a thermal comfort component, a comfort layer, a lumbar system, and an integrator shell.

FIG. 3 illustrates a seat back 10 in which the comfort integrator unit can incorporate further comfort features including a thermal comfort unit 12 and a lumbar support system 16. In this embodiment, similar to FIG. 2, integrator shell 18 has integrated plastic cross-bar supports 34 configured for lumbar system 16 to be hung on and supported so that the lumbar system 16 is positioned between the comfort layer 14 and the integrator shell 34. Integrator shell 18 may further be formed to include molded side bolsters 40. In this manner, comfort layer 14 may be thinner without sacrificing comfort.

Figure 3A:
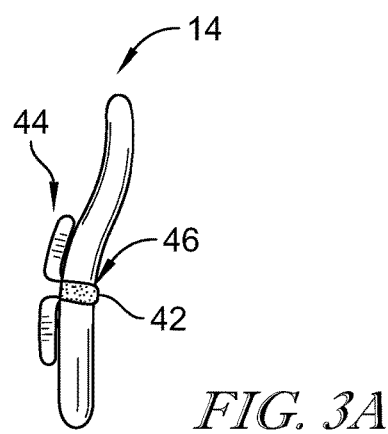
FIG. 3A is a side view of the comfort integrator unit of FIG. 3 illustrating how the thermal comfort component is integrated into the comfort layer.
Figure 4:
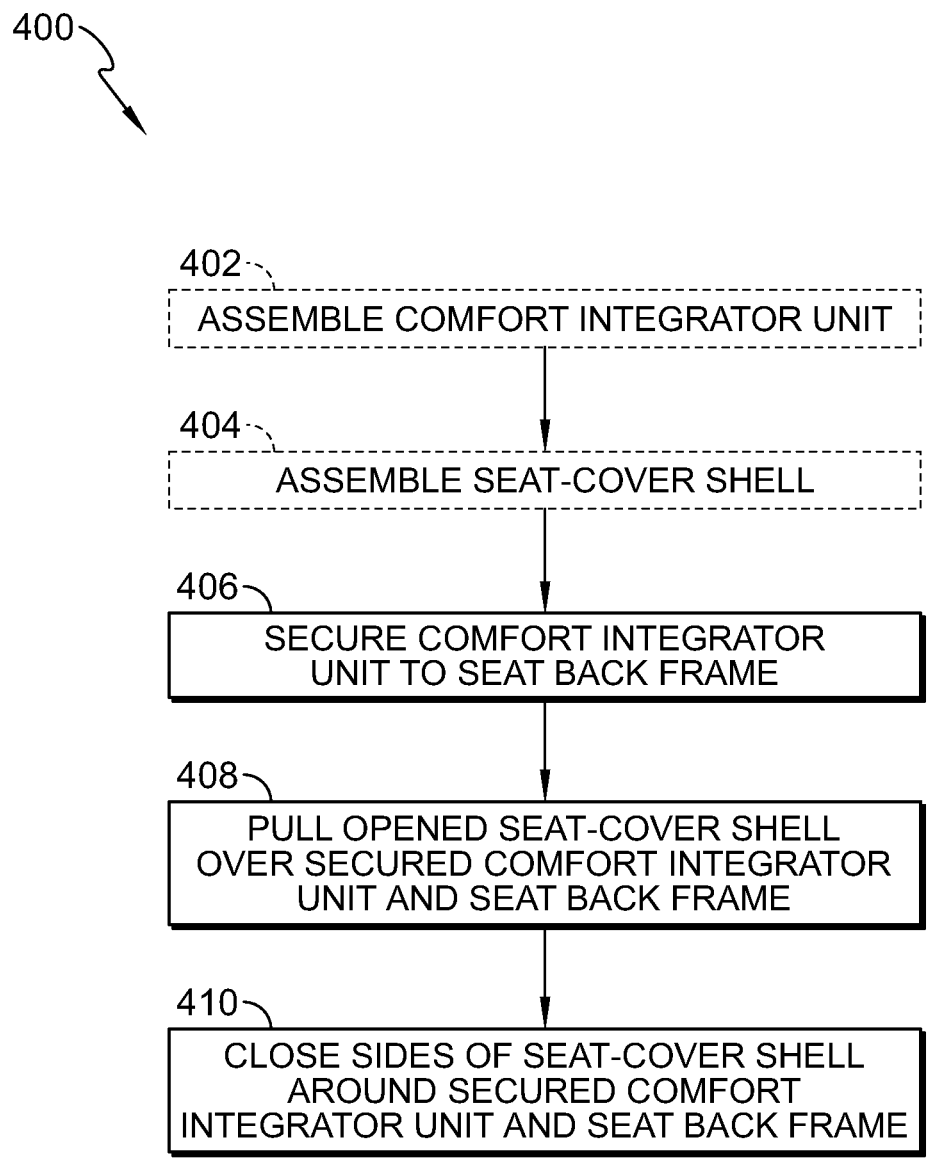
FIG. 4 is a block diagram of a process of assembling the comfort integrator unit, the seat-cover shell, and the vehicle seat back.

Thermal comfort component 12 may be a thermoelectric component comprising conductive material strips 44, configured to provide heating and cooling. Thermoconductive material strips 44 may include an engine and heat exchanger complex 42 at a midportion of each strip 44 to provide the heating and cooling to the strips. Thermoconductive strips may be positioned so that the ends extend along a front surface of the comfort layer 14 as shown in FIG. 3a. Openings 46 may be formed in the comfort layer 14 for the engine/exchanger complex 42 to be inserted into 42 so that further wiring can be attached at the rearward side of the integrator shell 18. An example of a thermal comfort component configuration can be found in U.S. application Ser. No. 15/787,161 VEHICLE SEAT WITH THERMAL DEVICE incorporated by reference in its entirety.

In a method of assembling a seat back 400 for a vehicle, each of the comfort integrator unit 402 and the assembly of the seat-cover shell 404 may optionally take place remotely from the seat back assembly line. As discussed above with respect to FIGS. 1-3, comfort integrator unit may include a comfort layer coupled integrator shell by way of adhesive or another fastening mechanism. The comfort integrator unit may also include one or more of a thermal comfort component and a lumber component so that the overall assembled comfort integrator unit may be packaged, shipped, and installed as a single unit. Seat cover shell may include a molded sculpted seat cover and a seat back cover that are formed to maintain their shape and sewn or otherwise coupled together at a top in order to form a clam-shell like configuration to open and close around the seat-back frame and comfort integrator unit. Likewise, the overall assembled seat-cover shell may be packaged, shipped, and installed as a single unit.

The installation process described in steps 406-410 may take place at a vehicle assembly line or seat assembly line. The comfort integrator unit is secured to the seat-back frame 406, using either manual or robotic automated assembly. For example, fasteners such as screws, bolts or other mechanisms may be fed through the seat-back frame into the integrator shell. Once the comfort integrator is secured, the seat-cover shell in an opened configuration may be pulled over the top of the secured comfort integrator unit and seat-back frame 408 so that the sculpted seat cover is positioned over the front of the comfort integrator unit and the seat back cover is positioned over the seat-back frame. Once positioned, the sides of the seat-cover shell can be secured and closed to each other to form a tight fit around the comfort integrator unit and the seat-back frame to hold all of the interior components in position 410. This may be done, for example, by zipping zippers laterally down each side of the seat-cover shell from the sewn joined top to join together the sides of the front of the comfort integrator unit and the seat back cover to form an assembled seat back.

The following numbered clauses include embodiments that are contemplated and non-limiting:

Clause 1. A seat back comprising a seat-back frame.

Clause 2. The seat back of clause 1, any other clause, or any combination of clauses, further comprising a comfort integrator unit configured to be secured to the seat-back frame.

Clause 3. The seat back of clause 2, any other clause, or any combination of clauses, wherein the comfort integrator unit includes an integrator shell.

Clause 4. The seat back of clause 3, any other clause, or any combination of clauses, wherein the comfort integrator unit includes a lumbar system coupled to the integrator shell to hang from cross-bars include in the integrator shell.

Clause 5. The seat back of clause 4, any other clause, or any combination of clauses, wherein the comfort integrator includes a comfort layer coupled to a passenger-receiving face of the integrator shell so as to locate the lumbar system between integrator shell and the comfort layer.

Clause 6. The seat back of clause 5, any other clause, or any combination of clauses, further comprising a seat-cover shell including a passenger-receiving sculpted face and a rigid back face, joined together at a hinged top interface and configured to move between an open position in order to receive the seat-back frame and comfort integrator therein and a closed position to maintain the integrator shell, the lumbar system, and the comfort layer in a fixed position relative to the seat-back frame.

Clause 7. The seat back of clause 6, any other clause, or any combination of clauses, further comprising a thermal component coupled to the comfort layer and located between the passenger-receiving sculpted face of the seat-cover shell and comfort layer.

Clause 8. The seat back of clause 7, any other clause, or any combination of clauses, wherein the thermal comfort component is a resistive heat mat.

Clause 9. The seat back of clause 7, any other clause, or any combination of clauses, wherein the thermal comfort component is a thermoelectric component comprising conductive material strips configured to provide both heating and cooling.

Clause 10. The seat back of clause 9, any other clause, or any combination of clauses, wherein each conductive material strip includes an integrated thermal engine and heat exchanger configured to be affixed within openings formed in the comfort layer.

Clause 11. The seat back of clause 6, any other clause, or any combination of clauses, wherein the hinge comprises a length of an interface between the passenger receiving sculpted face and the rigid back face sculpted seat cover shell further comprises a zipper extending laterally from each side of the hinge configured to maintain the seat-cover shell in the closed position.

Clause 12. The seat back of clause 6, any other clause, or any combination of clauses, wherein the comfort integrator comprises integral side bolsters and the comfort integrator is made of a molded plastic material.

Clause 13. A method of assembling a seat back comprising:
providing a comfort integrator unit.

Clause 14. The method of clause 13, any other clause, or any combination of clauses, wherein the comfort integrator unit comprises at least a plastic comfort integrator.

Clause 15. The method of clause 14, any other clause, or any combination of clauses, wherein the comfort integrator unit further includes a comfort layer coupled to the plastic comfort integrator.

Clause 16. The method of clause 15, any other clause, or any combination of clauses, wherein the comfort integrator unit further includes a lumbar system coupled therebetween.

Clause 17. The method of clause 16, any other clause, or any combination of clauses, further comprising coupling the comfort integrator unit to a vehicle seat-back frame.

Clause 18. The method of clause 17, any other clause, or any combination of clauses, further comprising encasing the comfort integrator unit and the vehicle seat-back frame in a sculpted seat cover shell by pulling the shell over the comfort integrator unit and the vehicle component in a shell opened position.

Clause 19. The method of clause 18, any other clause, or any combination of clauses, further comprising securing the shell in a closed position to establish the seat back.

Clause 20. The method of clause 19, any other clause, or any combination of clauses, wherein the shell comprises a passenger receiving sculpted face and a rigid back face, joined together at a hinged top interface, and the shell is secured via zippers extending longitudinally from each end of the hinged top interface.

Clause 21. The method of clause 19, any other clause, or any combination of clauses, wherein coupling the comfort integrator unit to the vehicle seat-back frame is performed robotically by automated insertion of fasteners into the vehicle seat back and the plastic comfort integrator.

Clause 22. The method of clause 19, any other clause, or any combination of clauses, wherein the comfort integrator unit further comprises a thermal comfort component coupled to the comfort layer so that the thermal comfort component is positioned between the comfort layer and the passenger receiving sculpted face of the sculpted seat cover shell.

Clause 23. The method of clause 19, any other clause, or any combination of clauses, further comprising coupling a thermal comfort component to the comfort layer prior to coupling the comfort integrator unit to the vehicle seat-back frame.

Clause 24. The method of clause 13, any other clause, or any combination of clauses, wherein the thermal comfort component is a resistive heat mat.

Clause 25. The method of clause 13, any other clause, or any combination of clauses, wherein the thermal comfort component is a thermoelectric component comprising conductive material strips configured to provide both heating and cooling.

Clause 26. The method of clause 25, any other clause, or any combination of clauses, wherein each conductive material strip includes an integrated thermal engine and heat exchanger configured to be affixed within openings formed in the comfort layer.

Clause 27. The method of clause 19, any other clause, or any combination of clauses, wherein the comfort integrator unit further comprises a lumbar support system coupled between the comfort layer and the integrator shell.

Clause 28. A seat back comprising:
a seat-back frame.

Clause 29. The seat back of clause 28, any other clause, or any combination of clauses further comprising a comfort integrator unit configured to be secured to the seat-back frame, the comfort integrator unit including an integrator shell and a comfort layer coupled to a passenger-receiving face of the integrator shell.

Clause 30. The seat back of clause 29, any other clause, or any combination of clauses, further comprising a seat-cover shell including a passenger-receiving sculpted face and a rigid back face, joined together at a hinged top interface and configured to move between an open position in order to receive the seat-back frame and comfort integrator therein and a closed position to maintain the integrator shell, the lumbar system, and the comfort layer in a fixed position relative to the seat-back frame.

Clause 31. The seat back of clause 30, any other clause, or any combination of clauses, wherein comfort integrator unit further comprises a lumbar system coupled to the integrator shell to hang from cross-bars include in the integrator shell, so as to locate the lumbar system between integrator shell and the comfort layer.

Clause 32. The seat back of clause 30, any other clause, or any combination of clauses, wherein the comfort integrator unit further comprises a thermal component coupled to the comfort layer and located between the passenger-receiving sculpted face of the seat-cover shell and comfort layer.

Clause 33. The seat back of clause 32, any other clause, or any combination of clauses, wherein the thermal comfort component is a thermoelectric component comprising conductive material strips configured to provide both heating and cooling

The invention claimed is:
1. A seat back comprising:
a seat-back frame,
a comfort integrator unit configured to be secured to the seat-back frame, the comfort integrator unit including an integrator shell, a lumbar system coupled to the integrator shell to hang from cross-bars included in the integrator shell, and a comfort layer coupled to a passenger-receiving face of the integrator shell so as to locate the lumbar system between integrator shell and the comfort layer, and
a seat-cover shell including a passenger-receiving sculpted face and a rigid back face, joined together at a hinged top interface and configured to move between an open position in order to receive the seat-back frame and comfort integrator therein and a closed position to maintain the integrator shell, the lumbar system, and the comfort layer in a fixed position relative to the seat-back frame.

2. The seat back of claim 1, further comprising a thermal component coupled to the comfort layer and located between the passenger-receiving sculpted face of the seat-cover shell and comfort layer.

3. The seat back of claim 2, wherein the thermal comfort component is a resistive heat mat.

4. The seat back of claim 2, wherein the thermal comfort component is a thermoelectric component comprising conductive material strips configured to provide both heating and cooling.

5. The seat back of claim 4, wherein each conductive material strip includes an integrated thermal engine and heat exchanger configured to be affixed within openings formed in the comfort layer.

6. The seat back of claim 1, wherein the hinge comprises a length of an interface between the passenger receiving sculpted face and the rigid back face sculpted seat cover shell further comprises a zipper extending laterally from each side of the hinge configured to maintain the seat-cover shell in the closed position.

7. The seat back of claim 1, wherein the comfort integrator comprises integral side bolsters and the comfort integrator is made of a molded plastic material.

8. A method of assembling a seat back comprising:
providing a comfort integrator unit comprising at least a plastic comfort integrator, a comfort layer coupled to the plastic comfort integrator, and a lumbar system coupled therebetween,
coupling the comfort integrator unit to a vehicle seat-back frame, and
encasing the comfort integrator unit and the vehicle seat-back frame in a sculpted seat cover shell by pulling the shell over the comfort integrator unit and the vehicle component in a shell opened position, and
securing the shell in a closed position to establish the seat back.

9. The method of claim 8, wherein the shell comprises a passenger receiving sculpted face and a rigid back face, joined together at a hinged top interface, and the shell is secured via zippers extending longitudinally from each end of the hinged top interface.

10. The method of claim 8, wherein coupling the comfort integrator unit to the vehicle seat-back frame is performed robotically by automated insertion of fasteners into the vehicle seat back and the plastic comfort integrator.

11. The method of claim 8, wherein the comfort integrator unit further comprises a thermal comfort component coupled to the comfort layer so that the thermal comfort component is positioned between the comfort layer and the passenger receiving sculpted face of the sculpted seat cover shell.

12. The method of claim 8 further comprising coupling a thermal comfort component to the comfort layer prior to coupling the comfort integrator unit to the vehicle seat-back frame.

13. The method of claim 12, wherein the thermal comfort component is a resistive heat mat.

14. The method of claim 12, wherein the thermal comfort component is a thermoelectric component comprising conductive material strips configured to provide both heating and cooling.

15. The method of claim 14, wherein each conductive material strip includes an integrated thermal engine and heat exchanger configured to be affixed within openings formed in the comfort layer.

16. The method of claim 8, wherein the comfort integrator unit further comprises a lumbar support system coupled between the comfort layer and the integrator shell.

17. A seat back comprising:
a seat-back frame,
a comfort integrator unit configured to be secured to the seat-back frame, the comfort integrator unit including an integrator shell and a comfort layer coupled to a passenger-receiving face of the integrator shell, and
a seat-cover shell including a passenger-receiving sculpted face and a rigid back face, joined together at a hinged top interface and configured to move between an open position in order to receive the seat-back frame and comfort integrator therein and a closed position to maintain the integrator shell, the lumbar system, and the comfort layer in a fixed position relative to the seat-back frame.

18. The seat back of claim 17, wherein the comfort integrator unit further comprises a lumbar system coupled to the integrator shell to hang from cross-bars include in the integrator shell, so as to locate the lumbar system between integrator shell and the comfort layer.

19. The seat back of claim 17, wherein the comfort integrator unit further comprises a thermal component coupled to the comfort layer and located between the passenger-receiving sculpted face of the seat-cover shell and comfort layer.

20. The seat back of claim 19, wherein the thermal comfort component is a thermoelectric component comprising conductive material strips configured to provide both heating and cooling.

* * * * *